United States Patent [19]

Anderson et al.

[11] E Re. 28,510

[45] Reissued Aug. 12, 1975

[54] SPINDLE ASSEMBLY

[75] Inventors: Gordon C. Anderson, Clemson; John D. Page, Greenville, both of S.C.

[73] Assignee: Maremont Corporation, Chicago, Ill.

[22] Filed: Feb. 8, 1973

[21] Appl. No.: 330,564

Related U.S. Patent Documents

Reissue of:

[64] Patent No.: 3,640,062
Issued: Feb. 8, 1972
Appl. No.: 77,058
Filed: Oct. 1, 1970

[52] U.S. Cl. ..... 57/88; 57/130
[51] Int. Cl. ..... D01h 7/12; D01h 7/22
[58] Field of Search ..... 57/88, 89, 129–135; 308/149, 150, 155

[56] References Cited

UNITED STATES PATENTS

| | | | |
|---|---|---|---|
| 3,120,094 | 2/1964 | Keyser | 57/130 |
| 3,309,860 | 3/1967 | Keyser | 57/130 |
| 3,364,670 | 1/1968 | Stiepel et al. | 57/88 |
| 3,373,556 | 3/1968 | Stahlecker et al. | 57/88 |
| 3,552,113 | 1/1971 | Staufers | 57/130 |

*Primary Examiner*—John Petrakes
*Attorney, Agent, or Firm*—Donald H. Feldman

[57] ABSTRACT

An improved spindle assembly for textile spinning and twisting machines is disclosed wherein a plurality of spindle blade supporting ball bearing sets and a whirl-supporting ball bearing set are aligned and supported by a single support sleeve concentric with the spindle blade which sleeve vertically terminates intermediate the whirl. One or more of said sets may have a flexible or resilient member interposed between a bearing set and the sleeve and/or the whirl and/or the spindle blade to help provide and maintain the precise alignment required of all sets from the axial centerline of the spindle blade. Also disclosed is an electromagnetically operable drive and brake clutch subassembly which is positionally adjustable on and supported by the sleeve.

14 Claims, 2 Drawing Figures

SPINDLE ASSEMBLY

Figure 1:
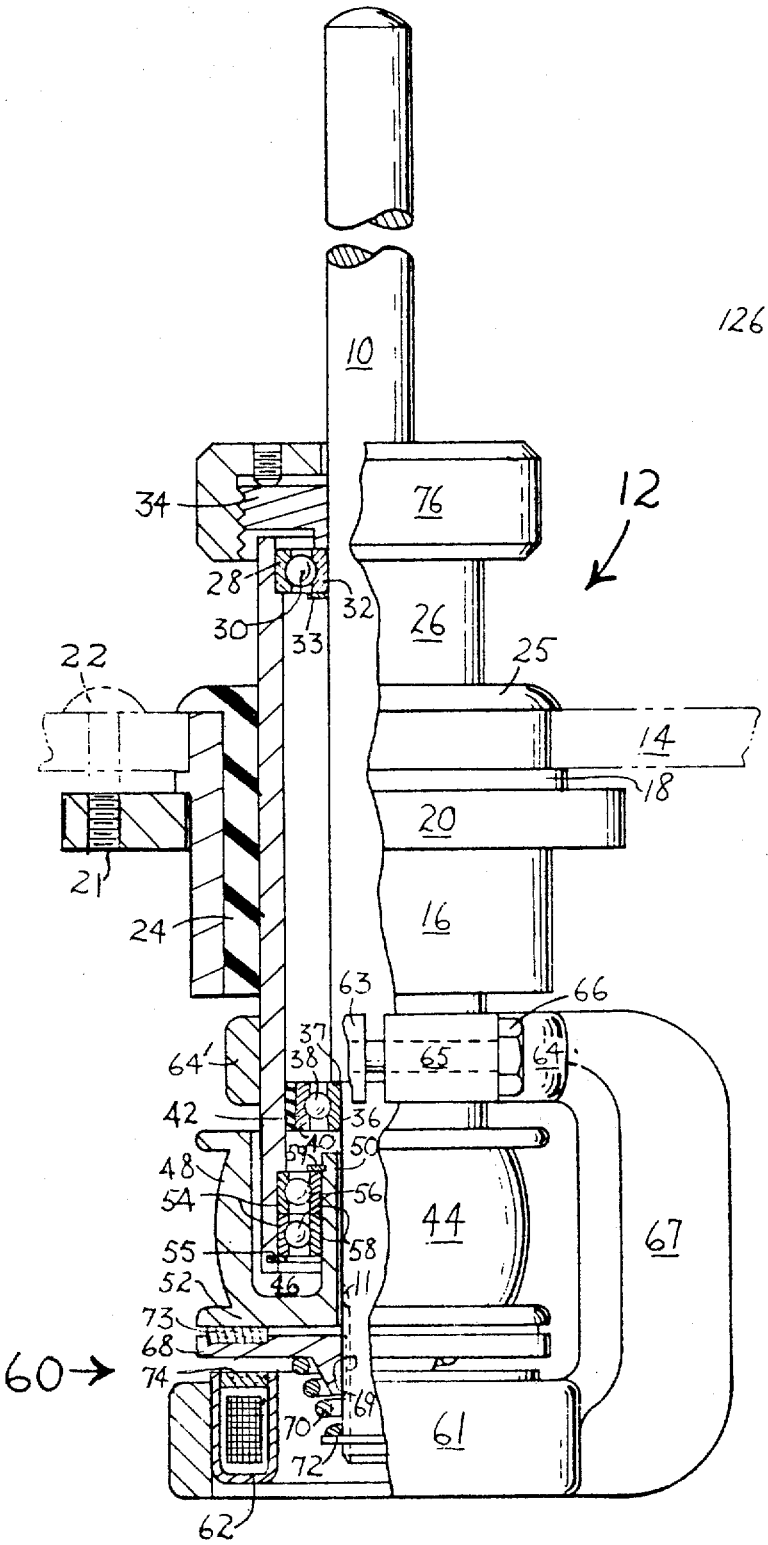

Matter enclosed in heavy brackets [ ] appears in the original patent but forms no part of this reissue specification; matter printed in italics indicates the additions made by reissue.

BACKGROUND OF THE INVENTION

This invention relates generally to an improved spindle assembly for use with textile spinning and twisting machines. In particular, the invention relates to a spindle assembly wherein all spindle and whirl bearings are aligned by and supported by a single support sleeve, and wherein an electromagnetically operable drive and brake clutch subassembly is positionally adjustable on and supported by said sleeve.

The problems involved in obtaining and maintaining proper alignment of a plurality in excess of two ball bearing sets on a single center, such as the axial line of a spindle blade, have been of such magnitude as to cause engineers to avoid such constructions whenever possible. When used, however, if even slight misalignment of one of the ball bearing sets occurs, this set tends to "work against" the other sets to produce not only reduced efficiency of all sets, but in time an intolerable wear requiring replacement of one or more sets. In spindle assemblies of the prior art, especially those employing an electromagnetically operable drive and brake clutch subassembly such as that disclosed by Stiepel et al. in their U.S. Pat. No. 3,364,670, it has been known to use two spaced ball bearing sets supported by a sleeve to support the spindle blade for rotation and another ball bearing set supported by the whirl and its bolster for whirl rotation, said bolster also supporting at least in part the clutch subassembly. For the clutch to be reliably operable and to prevent an intolerable fretting of the interconnections between clutch members and the spindle blade, a precise and fixed alignment of all bearing sets is required, the alignment of each ball bearing set being at a predetermined radial distance from the axial center line of the spindle blade. If, as mentioned, one or more ball bearing sets is out of alignment either through initial misalignment or through misalignment occurring during machine operation, the sets will work against one another resulting in the aforesaid fretting of interconnections and an ultimate inoperativeness of the clutch and/or irreparable damage to the spindle blade or other components of the assembly. Attaining and maintaining such precise alignment in prior art constructions, such as that of the aforementioned U.S. Pat. No. 3,364,670, has been a most difficult task due to the number and types of interconnections joining the supports for the various ball bearing sets; misalignment, in this regard, may easily be produced by merely tightening one connection more than another during assembly.

Another problem exists with regard to the electromagnetic clutch. For it to be properly and reliably operable, precise adjustability of the airgap between the electromagnetic coil bearing member and the clutch plate must be provided, in order to balance the electromagnetic forces of attraction with the magnetic reluctance of the airgap and other components and against the restraining forces of the spring on the clutch plate, so that prompt and even braking of the spindle blade will occur when the coil is energized. In some constructions, such as that of the aforesaid U.S. Pat. No. 3,364,670, adjustment is made by axially displacing the clutch plate in a vertical direction relative the coil by a screw; however, in tightening or locking the screw in position, the adjustment may be changed from that desired.

Yet another problem exists with respect to the alignment and maintenance of alignment of both the coil braking surface and the driving and braking surfaces of the clutch plate in the clutch subassembly. Such surfaces, for proper driving and braking of the spindle blade must be set and maintained normal or perpendicular to the axial centerline of the spindle blade. If any of these surfaces are out-of-normal, failure to drive and/or brake the spindle blade will result, making the spindle assembly inoperative. In prior art constructions, such alignment and maintenance thereof was quite difficult to achieve, again due to the plurality of supports and interconnections therebetween, misadjustment of any of such interconnections either during assembly or in machine operation resulting in misalignment and operational failure of the spindle assembly.

It is to the remedy of these difficulties that the present invention is directed.

OBJECTS OF THE INVENTION

Thus, it is an object of the invention to provide an improved spindle assembly wherein all spindle and whirl ball bearings are precisely aligned and supported by a single support sleeve.

Another object of the invention is to provide an improved spindle assembly wherein the airgap between the electromagnetic coil element and the clutch plate of the drive and brake clutch subassembly and the driving and braking surfaces thereof may be precisely adjusted and maintained by means of support from said support sleeve.

Yet another object of the invention is to provide the aforesaid spindle assembly which is simply and easily assembled and disassembled without the need for realignment of the bearings or clutch driving and braking surfaces through mechanical readjustments.

SUMMARY OF THE INVENTION

Further desirable objects of the invention are readily made apparent by or are inherent in the description of the invention which follows when taken in conjunction with the appended drawings.

Generally, the present invention contemplates an improved spindle assembly having a spindle blade concentrically within a support sleeve, its spaced away ball bearing sets therebetween being aligned and supported by the sleeve. The driving whirl is proximal the lower end of the spindle blade, with the support sleeve terminating vertically intermediate the whirl, and has a ball bearing set therebetween aligned and supported by the sleeve. An electromagnetically operable drive and brake clutch subassembly with a supporting bolster is used, wherein the operative elements of the clutch are positioned below the whirl, the bolster bearing the coil is adjustably positionable on and supported from the support sleeve and the clutch plate is supported by the spindle blade.

THE DRAWINGS

FIG. 1, in side elevational view partially broken away

ıd partially in section, illustrates one embodiment of ıe present spindle assembly.

Figure 2:
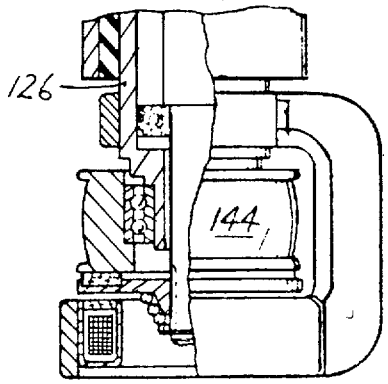

FIG. 2, in similar view to that of FIG. 1, shows a por- on of another embodiment of the invention.

PREFERRED EMBODIMENTS

In FIG. 1, a spindle blade 10 held within a spindle as- mbly, generally designated 12, is secured thereby to spindle rail 14 (in phantom lines) of a textile spinning twisting machine (not shown).

Assembly 12 comprises a mounting ring 16 having an ternally extending flange 18 for engaging rail 14; a cking collar 20 therebeneath having threaded holes l therein for receiving a plurality of locking bolts 22 n phantom lines) to secure assembly 12 to rail 14; a bration damping collar 24 fixedly secured to the in- rnal annular periphery of ring 16 having a cap flange 5 covering any space between ring 16 and rail 14; a ıpport sleeve 26 fixedly secured within and to the in- rnal annular periphery of damping collar 24 and ex- nding upwards and downwards therefrom; an upper ›indle ball bearing set comprising an outer race 28 ıpported by sleeve 26 and aligned thereby, bearing ılls 30 and an inner race 32 supported by and aligned ith blade 10 by means of retaining ring 33 therebe- ɜath and the bottom surface of a blade flange 34 ıereabove; a lower spindle ball bearing set comprising ı inner race 36 aligned with blade 10 and supported y a retaining lip 37 of blade 10 thereover, bearing ılls 38 and an outer race 40 aligned by and supported om sleeve 26 by a flexible or resilient collar 42 there- ɜtween fixed to race 40; a whirl 44 for driving blade ) having an annular cavity 46 for receiving within the wer terminal of sleeve 26 and being defined by the ner surfaces of the whirl's driving collar 48, an inter- ıl upstanding cylindrical member 50 adjacent to and ›aced from blade 10 and a bottom member 52 joining ›llar 48 with member 50; a double ball bearing set to ıpport whirl 44 for rotation, comprising outer races 4 supported and aligned by sleeve 26 with a retaining ng 55 therebeneath, bearing balls 56 and inner races 8 aligned with and supported by whirl member 50 by eans of retaining ring 59 thereover; and an electro- agnetically operabale spindle drive and brake clutch ıbassembly, generally designated 60, its operable embers located beneath whirl 44 and sleeve 26, com- ·ising a support bolster having an annular bottom ember 61 to support an electromagnetic coil 62 and receive the bottom end of blade 10 having a splined ıter surface 11, and having two split ring upper mem- ɜrs 64,64' each with opposing laterally outstanding anges 63,65 on each side thereof threaded to receive leasable clamping bolts 66 and being locatable ·ound sleeve 26 intermediate whirl 44 and mounting ng 16 so as to be positionably adjustable thereon, and ırther having a vertical member 67 joining annular ›ttom member 61 to upper member 64; a clutch plate 8 supported above coil 62 and normally biased against ıe bottom surface of whirl member 52 by a spring 70 ɜld by a retaining ring 72 at the end of blade 10, plate 8 having at its inner annular surface facing blade 10 spline 69 for cooperation with blade spline 11 and a ictional member 73 along its upper horizontal surface ır cooperation with the lower surface of whirl member 2, the upper horizontal surface of coil 62 also having frictional member 74 for cooperation with the lower ırface of clutch plate 68 upon energization of coil 62.

Also shown atop blade flange 34 is a bobbin tube seating cap 76 being cooperable therewith and height adjustable relative thereto by an interconnecting screw thread therebetween.

Turning to FIG. 2, otherwise identical to the embodiment of FIG. 1, sleeve 126 proximal its lower end at its outer surface is stepped to support and align the whirl ball bearing sets with respect to blade 10 and an internally stepped annular whirl 144; in this embodiment, sleeve 126 supports the inner races of the whirl ball bearing sets which remain stationary therewith and whirl 144 supports the outer races which are rotatable therewith.

OPERATION

In the spinning or twisting of yarn by a textile machine using the present spindle assembly, whirls 44,144 are constantly rotated by means of a tape drive (not shown) under tension about the driving members of the whirls (such as member 48 in FIG. 1). Clutch plate 68, normally in biased contact with the lower surface of rotating whirl 44 through friction member 73 and spring 70 and with spindle blade 10 through splines 69,11, rotates with whirl 44 and drives blade 10 and a bobbin tube (not shown) seated upon cap 76. Upon the detection of a break in the yarn being spun or twisted upon the bobbin tube, coil 62 is energized, its electromagnetic forces of attraction drawing clutch plate 68 downward out of driving contact with whirl 44 and into braking contact with friction member 74 of coil 62, braking the rotation of blade 10, plate 68 being vertically displaceable along blade 10 by means of interconnecting splines 11,69. In operation, outer ball bearing races 28,40,54 (FIG. 1) are maintained stationary by sleeve 26, while inner races 32,36 rotate with blade 10 and inner races 58 rotate with whirl 44; thus, in operation, there is always relative motion between the inner and outer races, permitting bearing balls 30,38,56 to rotate and perform their proper function. The precise alignment of ball bearing sets here attained by means of sleeve 26 assures maximum efficacious functioning of the present spindle assembly. After a plurality of brakings, coil friction member 74 and the bottom surface of clutch plate 68 will in due course wear, increasing the airgap and thus the electromagnetic reluctance, which increase in time will become so substantial as to prevent the braking of blade 10 and thus making the clutch subassembly inoperative therefor. The yarn bobbin package, in this instance, will continue to rotate, oftimes throwing off substantial quantities of damaged yarn, known to the art as "snow storming." This is avoided by stopping the machine, loosening bolts 66, placing shims of proper gap depth between plate 68 and member 74, moving the bolster upward upon sleeve 26 to provide the proper airgap separation between plate 68 and member 74 once again, tightening bolts 66 and removing the shims. Such repositioning of coil 62 thus may be made easily, quickly and with a high degree of precision. Upon coil repositioning, the assembly once again is operative.

ASSEMBLY AND DISASSEMBLY

Assembly and disassembly of the present device for purposes of replacing ball bearing sets, or their regreasing, or the replacement of the clutch plate or other components may be made easily and quickly without the necessity for the many manual and/or mechanical readjustments often required with prior art constructions to properly align or realign the ball bearing sets and/or the clutch subassembly and its component members and/or the various supports. According to the present construction, sleeve 26, resilient damping collar 24 and mounting ring 16 preferably are bonded together to form a unit such as by cementing their confronting surfaces with a permanent structural adhesive; annular, threaded blade flange 34 is made integral with blade 10 as by press fitting or being formed integrally with blade 10 and resilient collar 42 is stretched over race 40 to form a unit. In assembly, top ball bearing set 28,30,32 is slipped over the bottom of blade 10 and press fitted in position adjacent the bottom of flange 34 and thereupon retaining ring 33 is snapped into place thereunder; lower ball bearing set 36,38,40 and resilient collar 42 attached thereto are inserted onto blade 10 and press fitted into position adjacent lip 37, the blade surfaces for such press fittings being of slightly larger diameters that the inner annular surfaces of the respective inner races; whirl ball bearing sets 54,56,58 are press fitted onto upstanding cylindrical member 50 of whirl 44 in similar fashion, thereupon upper retaining ring 59 is snapped into position thereover; blade 10 and its attached ball bearing sets are inserted downwardly into sleeve 26 until upper ball bearing set 28,30,32 is positioned atop an aligning and support step along the inner top annular surface of sleeve 26, thus accurately positioning and supporting all spindle ball bearing sets thereby; whirl 44 and its attached ball bearing sets are inserted over the bottom of blade 10, with sleeve 26 entering whirl cavity 46 until the upper outer race 54 abuts an aligning and support step along the inner bottom annular periphery of sleeve 26, thereupon retaining ring 55 is inserted into cavity 46 through a slot (not shown) in bottom member 52 and snapped into position beneath lower outer race 54, whereby all ball bearing sets are aligned and supported by a single support sleeve with respect to a common center the axial line of blade 10. Clutch plate 68 is then inserted over the bottom end of blade 10 with member 73 facing upward, spring 70 is similarly inserted and retaining ring 72 is snapped into position thereunder; bolster members 61,67,64 separated from upper member 64' are then suitably positioned above and below whirl 44, upper member 64' is positioned facing member 64, bolts 66 are inserted and threaded through flanges 65,63, shims (not shown) are positioned betwen the bottom surface of plate 68 and coil member 74 to provide the proper airgap separation therebetween, bolts 66 are tightened, the shims are removed and cap 76 is screwed onto flange 34, completing the assembly for installation onto spindle rail 14. In disassembly, the foregoing steps are substantially reversed. The same steps are performed in assembling and disassembling the embodiment of FIG. 2, with the exception that the whirl ball bearing sets have been press fitted onto the lower outer stepped annular periphery of sleeve 126 rather than onto whirl 144, as in FIG. 1.

OTHER EMBODIMENTS

Many variations in construction may be made from the preferred embodiments shown and described while still retaining the present concept of aligning all ball bearing sets on one center using a single sleeve, and aligning and supporting the clutch subassembly with said sleeve again to maintain proper positioning from one center and to maintain clutch driving and braking surfaces normal thereto.

For example, whirl member 50 may be in the form of a sleeve press fitted to bottom member 52, for ease of manufacture; the sleeve step which is shown to abut outer race 54 may be extended upward so as to abut the top of flexible member 42 and race 40 to provide added support thereat; use of resilient collar 42 may be omitted altogether or employed on any of the ball bearing sets either at the outer or inner races or both, and the number of sleeve and whirl ball bearing sets may be varied as may support steps in the sleeve, such as being increased and/or repositioned from that shown for certain and use purposes. Further, to attain present ends, one or more roller bearing sets may be used in place of any or all of the ball bearing sets with equivalent efficacy.

For present purposes, the instant support sleeve conveniently may be considered to be a member of the spindle rail support mounting of the spindle assembly, which, as shown in the foregoing preferred embodiments, would also include such other supportive members as mounting ring 16, locking collar 20 and vibration damping collar 24.

Thus, having described the construction of embodiments, their operation and ease of assembly, and the utility and the advantages obtainable through the present invention, that which is claimed is:

1. An improved spindle assembly for textile spinning and twisting machines comprising:

a spindle blade;

a single bearing support sleeve concentric with said spindle blade;

a driving whirl concentric with both said spindle blade and said support sleeve;

a plurality of spindle bearing sets aligned and supported by and intermediate said spindle blade and said support sleeve; *and* a whirl bearing set aligned and supported by, and intermediate said whirl and said support sleeve [; and an electromagnetically operable drive and brake clutch subassembly substantially concentric with said spindle blade and supported by said spindle blade and said support sleeve].

2. A spindle assembly as in claim [1] *11* wherein said support sleeve terminates vertically intermediate said whirl, and said clutch subassembly is supported by said spindle blade below said whirl and by said sleeve above said whirl.

3. A spindle assembly as in claim 1 wherein said whirl bearing set is aligned and supported along the inner annular periphery of said support sleeve and having the outer race thereof maintained stationary thereby.

4. A spindle assembly as in claim 1 wherein said whirl bearing set is aligned and supported along the outer annular periphery of said support sleeve and having the inner race thereof maintained stationary thereby.

5. A spindle assembly as in claim 1 wherein at least one of said bearing sets bears a resilient collar intermediate a race thereof and a hereinbefore-defined supporting member of the spindle assembly.

6. In a spindle assembly comprising a spindle rail support mounting, a spindle blade, a driving whirl, [an electromagnetically operable drive and brake clutch subassembly disenageably interconnecting said blade and said whirl,] a plurality of spindle bearing sets inermediate said blade and rail support mounting, and a whirl bearing set intermediate said whirl and rail support mounting, the improvement comprising a single support sleeve member of said rail support mounting supporting all of said bearing sets and aligning them concentric with said blade.

7. The improvement as in claim [6] *13* wherein said sleeve terminates vertically intermediate said whirl and supports said clutch subassembly from above said whirl.

8. The improvement as in claim [6] *13* wherein said sleeve member supports all of said bearing sets along its inner annular periphery and said clutch assembly along its outer annular periphery.

9. The improvement as in claim [8] *13* wherein said bearing sets are positionally fixed and said clutch subassembly is positionally adjustable along said sleeve member.

10. The improvement as in claim [6] *13* wherein said sleeve member supports said spindle bearing sets along its inner annular periphery and said whirl bearing set and clutch subassembly along its outer annular periphery.

*11. A spindle assembly as in claim 1, further comprising a drive and brake clutch subassembly substantially concentric with said spindle blade and supported by said spindle blade and said support sleeve.*

*12. A spindle assembly as in claim 11, wherein said drive and brake clutch subassembly is electromagnetically operable.*

*13. The improvement as in claim 6, further comprising a drive and brake clutch subassembly substantially concentric with said spindle blade, disengageably interconnecting said blade and said whirl and supported by said spindle blade and said support sleeve.*

*14. The improvement as in claim 13, wherein said drive and brake clutch subassembly is electromagnetically operable.*

* * * * *